April 24, 1962

K. W. SLIPP 3,030,766

CHAIN WELDING FIXTURE HAVING TENSIONED
ADJUSTABLE CHAIN SECURING MEANS

Filed Jan. 16, 1961

2 Sheets-Sheet 1

INVENTOR

Kenneth Wayne Slipp

BY

Spencer, Rockwell & Bartholow

ATTORNEYS

April 24, 1962   K. W. SLIPP   3,030,766
CHAIN WELDING FIXTURE HAVING TENSIONED
ADJUSTABLE CHAIN SECURING MEANS
Filed Jan. 16, 1961   2 Sheets-Sheet 2
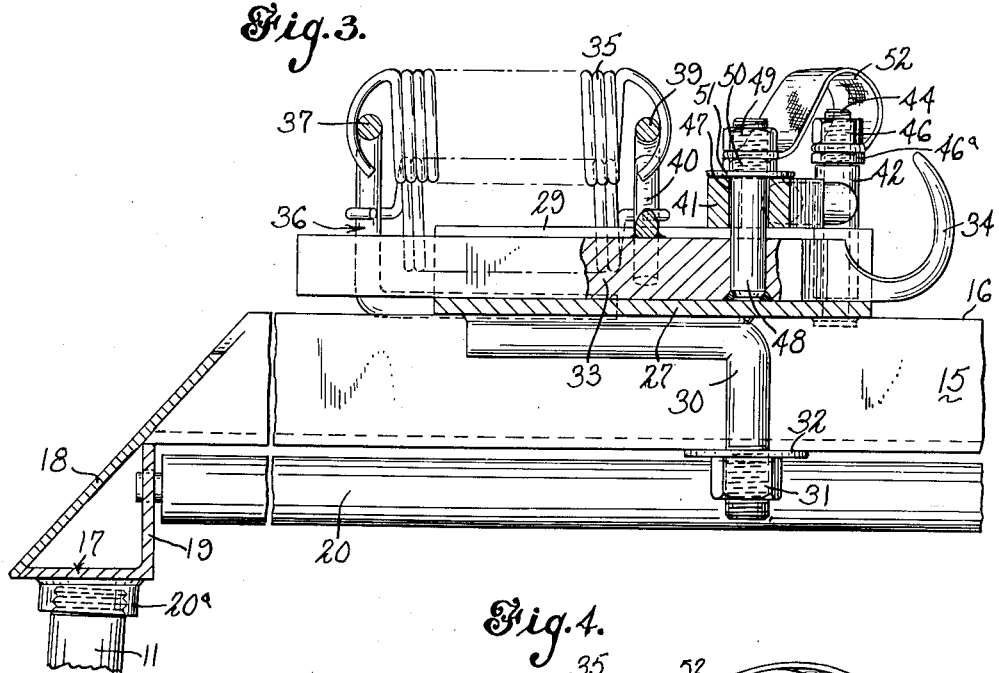
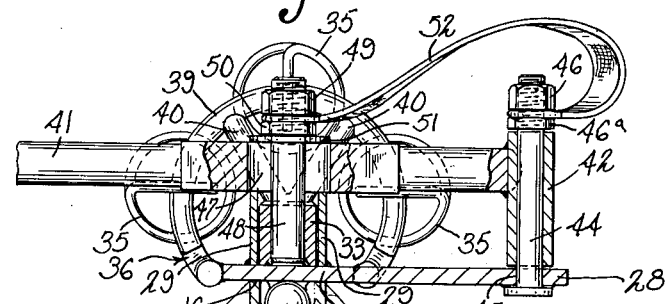
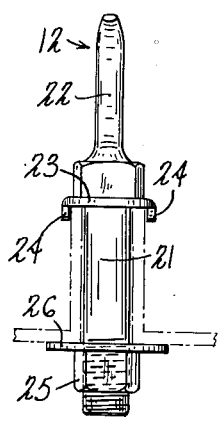
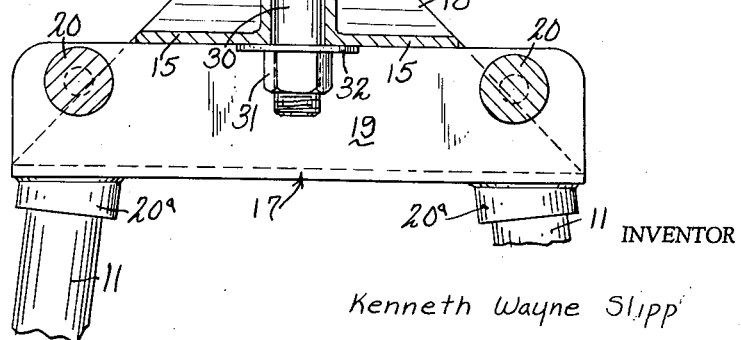
INVENTOR
Kenneth Wayne Slipp
BY
Spencer, Rockwell & Bartholow
ATTORNEY

United States Patent Office 3,030,766
Patented Apr. 24, 1962

3,030,766
CHAIN WELDING FIXTURE HAVING TENSIONED ADJUSTABLE CHAIN SECURING MEANS
Kenneth Wayne Slipp, Roast Meat Hill, Killingsworth, Conn.
Filed Jan. 16, 1961, Ser. No. 82,914
5 Claims. (Cl. 59—34)

This invention relates to welding fixtures and, while not limited thereto, relates more particularly to welding fixtures especially suitable for "hard surfacing" or rebuilding of worn surfaces of truck tire chains. Such "hard surfacing" or rebuilding of worn chain links is now commonly effected through the use of conventional electrical welding machines which rebuild worn chain areas with hard metal. This "hard surfacing" may restore chains to substantially their original condition. It is well known that truck tire chains, the original cost of which is substantial, are subject to heavy wear due to abrasion with road surfaces. The rebuilding or restoring of worn cross links by the aforementioned electrical welding process adds considerably to the service life of a set of chains and thereby results in substantial savings.

One object of the invention is to provide an improved welding fixture which is especially suitable for the support of truck tire chains, for example, while worn surface areas of the chains are being rebuilt or restored by an electrical welding machine. Other objects of the invention will be apparent from the following detailed description of the presently preferred form of the welding fixture shown by way of example in the accompanying drawings.

Figure 1:
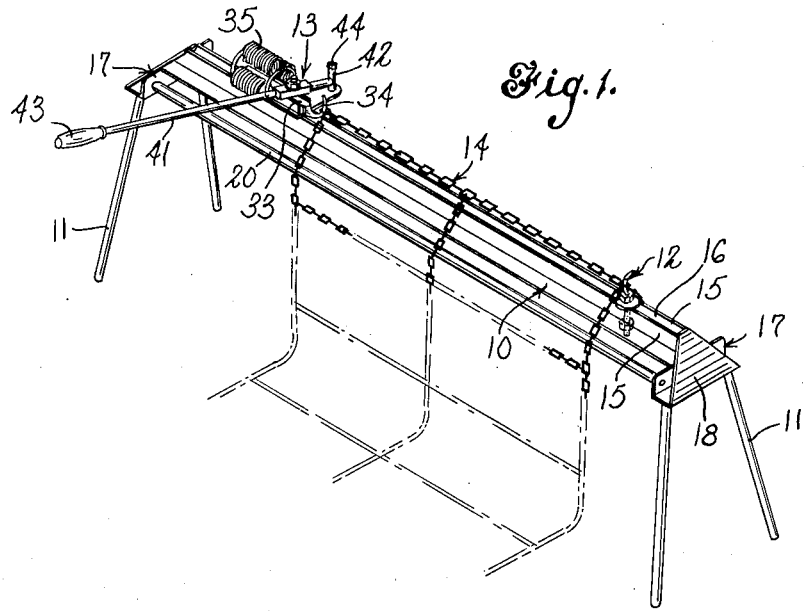
Figure 2:
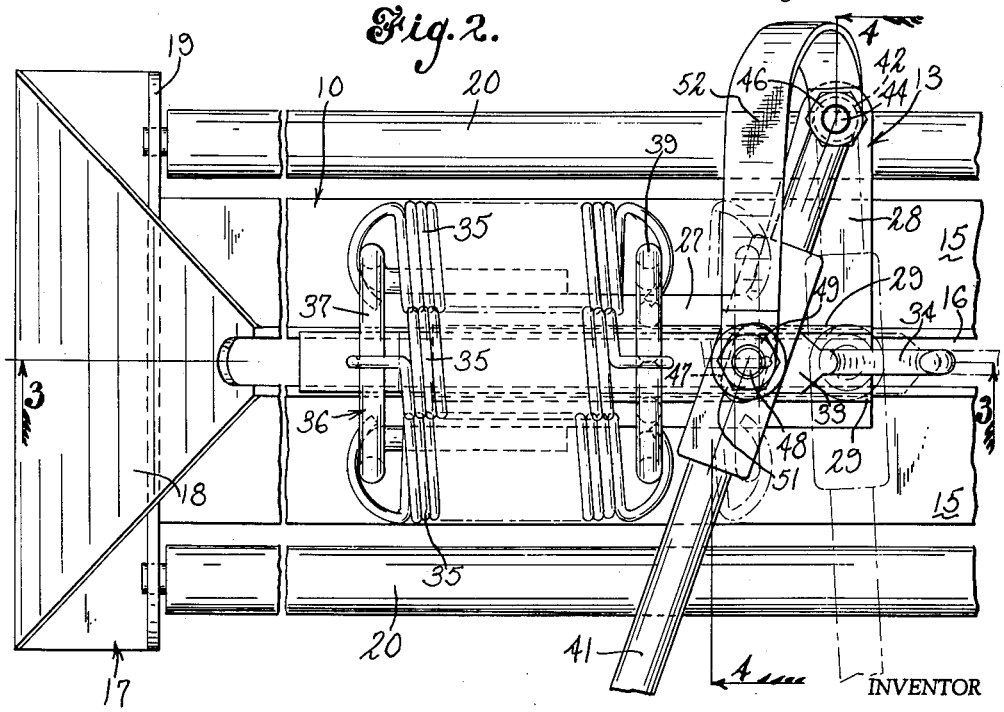

In the drawings:
FIG. 1 is a perspective view of a welding fixture embodying the invention;
FIG. 2 is an enlarged fragmentary top plan view of the fixture;
FIG. 3 is a sectional view taken on line 3—3 of FIG. 2;
FIG. 4 is a sectional view taken on line 4—4 of FIG. 2; and
FIG. 5 is an elevational view, illustrating one of the work supports of the fixture.

In the drawings the bed of the fixture is indicated generally at 10 and is shown by way of example as supported upon suitable legs 11. In the illustrated form the bed 10 is elongated horizontally and is provided with a work-supporting member, indicated generally at 12, adjustable lengthwise of the bed. Another work-supporting member, indicated generally at 13, is provided on the bed 10 for adjustment longitudinally of the latter. The work, such as a dual-wheel truck chain indicated generally at 14, is stretched between the work-supporting members 12 and 13 on the bed and maintained under a certain degree of tension, the work extending transversely of the fixture, as shown in FIG. 1.

Turning now to the details of the fixture, the bed 10 comprises a pair of laterally spaced angle irons 15 which form therebetween a slideway 16. Flanges 17 of L shape in cross section are arranged at the respective ends of the slideways 16 to laterally space and interconnect the angle irons 15, the flanges 17 being secured to the angle irons as by welding. A pair of plate parts are provided to close the respective ends of the slideway 16 and to reinforce the structure, these plate parts being indicated at 18. Each plate part 18 is generally of triangular form with its base arranged lowermost, the part being somewhat inclined as indicated in FIGS. 1 and 3, for example. Each plate part 18 may be secured to the angle irons 15 and to the corresponding flange 17 as by welding. The angle irons 15 may also be braced and supported from one another intermediate their ends by a cross member, not shown, extending below the angle irons 15.

As indicated in FIG. 2, for example, each flange 17 extends laterally to either side of the slideway 16 and is provided with an upstanding wall 19. A pair of rollers 20 is provided to extend along the respective sides of the slideway 16, the rollers being laterally spaced somewhat from the corresponding angle irons 15 and being located in a plane somewhat below the plane of the bottom of the slideway 16. The rollers 20, which serve as antifriction devices, as will appear more fully hereinafter, are journaled in the corresponding upright walls 19 of the flanges 17. The legs 11 of the fixture may be formed conveniently by lengths of pipe. The legs in the illustrated form number four, two being arranged at each end of the fixture. The upper ends of the legs may be externally threaded. Two pairs of internally threaded sleevelike parts 20a may be provided to threadedly receive the upper ends of the legs 11. Each pair of sleevelike parts 20a may be secured to the underside of one flange 17 in laterally spaced-apart relation, the parts 20a being secured to the corresponding flanges as by welding.

The work support member 12, best shown in FIG. 5, comprises a vertically arranged stub shaft which extends upwardly between the angle irons 15, the stub shaft indicated at 21 being rather closely received between the angle irons. The upper end portion 22 of the last-named shaft extends above the slideway 16 and is reduced in size and somewhat tapered. The portion 22 is also somewhat bent to provide a hook element over which a chain length may be slipped so that the chain may be supported from a hook element. As shown in FIG. 1, one of the longitudinal links at one side of the truck tire chain is slipped over the hook element.

Below the portion 22 the stub shaft is provided with a radially extending flange 23 to abut the upper surface of the slideway 16. The flange 23 is provided with downwardly bent lugs 24 which overlie the respective angle irons 15 and tend to prevent the stub shaft 21 from turning in the slideway. As previously indicated, the work support member 12 is infinitely adjustable lengthwise in the slideway 16, and means is provided to secure the member 12 in any desired adjusted position. For this purpose the lower end of the shaft 21 is threaded to receive a nut 25. A suitable washer 26 is interposed between the nut 25 and the bottom of the slideway 16. As indicated in FIG. 5, the last-named washer underlies lower surface portions of the angle irons 15 and may be clamped thereagainst by the nut 25. When the nut 25 is tightened, the shaft 21 is drawn downwardly in the slideway 16 so that the flange 23 of the shaft 21 may be firmly engaged with the upper edges of the angle irons 15. It will be manifest from the foregoing description that when it is desired to adjust the work support member 12 lengthwise in the slideway 16, the nut 25 is loosened to permit this movement of the member 12 by manipulation. The nut 25 may be re-tightened after the desired adjustment is made.

As best shown in FIG. 4, the work support member 13 comprises a horizontally extending plate part 27. The plate part 27 extends across both of the angle irons 15 for support thereby and has its greatest dimension arranged lengthwise of the slideway 16 formed by the angle irons 15. Adjacent one end thereof the plate part 27 is provided with a laterally extending arm 28. As shown in FIG. 2, the distal end of the arm 28 may be located beyond the angle iron 15 at the corresponding side of the slideway. As shown in FIG. 4, the plate part 27 is provided on the upper surface thereof with two laterally spaced, longitudinally arranged, upstanding walls 29 which may be secured to the plate part 27 as by welding. The plate part 27 is adjustable lengthwise on the angle irons 15, and, for the purpose of releasably securing the plate part 27 in any desired position on a slideway, an L-shaped bolt 30 is provided.

The bolt 30 is located in the slideway 16 and has one leg thereof extending lengthwise of the slideway and secured to the under surface of the plate part 27 as by welding. The other leg of the bolt 30 extends downwardly in the slideway and has a threaded portion located below the slideway to receive a nut 31. A washer 32 is interposed between the nut 31 and lower surface portions of the angle irons 15, as shown in FIG. 4. It will be manifest from the foregoing that when the nut 31 is tightened, the plate part 27 of the work support member 13 is drawn down tightly on the upper edges of the angle irons 15 to strongly resist forces tending to dislocate the plate part 27 in a direction longitudinally of the slideway 16. It will also be understood from the foregoing that the plate part 27 may be infinitely adjusted longitudinally of the slideway to any desired position in a manner similar to the above-described manner of adjustment of the work support member 12.

A slide 33 is slidably received between the walls 29 provided on the plate part 27, the slide being movable lengthwise of the slideway 16 and being elongated in this direction, as best shown in FIG. 3. The end of the slide 33 nearest the work support member 12 is provided with an upwardly extending hook element 34 similar to the portion 22 of the work support member 12. One of the longitudinal links at the side remote from the last-mentioned side of the truck tire chain may be slipped over the hook element 34 to be held thereby, as shown in FIG. 1.

The slide 33 is spring biased in a direction away from the work support member 12, and for this purpose a plurality of helical springs may be provided, the springs indicated at 35 numbering three in the illustrated form and being of the tension type. The springs 35 are preferably of heavy construction to strongly resist movement of the slide 33 in the direction of the work support member 12. Each spring 35 has one end thereof in fixed relation to the plate part 27. To effect this connection, a rigid bail preferably formed of rod stock is provided, the bail being indicated at 36. The bail, which is generally of inverted U shape, has an upstanding body or loop portion 37 located at the end of the plate part 27 remote from the arm 28. The end portions of the bail, which are bent to extend lengthwise of the plate part 27, are secured to the last-mentioned part as by welding. The last-mentioned ends of the springs 35 are secured to the bail 36 by being hooked over the upstanding loop portion 37, as indicated in FIG. 3. The springs 35, which are arranged in parallelism, have their last-mentioned ends engaging the bail 36 at spaced points along the loop portion 37 thereof.

The other ends of the springs are in fixed relation to the slide 33. To effect this connection an upstanding partial ring 39 is provided in embracing relation to the walls 29 which provide a slideway for the slide 33. The partial ring 39 is provided with spokes 40 having their inner ends secured to the top of the slide 33 as by welding. The last-mentioned ends of the springs 35 are hooked over the partial ring 39 at intervals on the circumference thereof.

An operating handle 41 is provided to effect movement of the slide 33 in a direction toward the work support member 12, this handle having at one end a tubular cross head 42 and having at the other end a hand grip portion 43. The tubular cross head 42 receives an upwardly arranged pivot 44 mounting the handle for swinging movement in a horizontal plane, the pivot 44 extending through a hole 45 formed in the arm 28 of the platelike part 27. This hole is provided in the outer end portion of the arm 28, and the pivot 44 is provided with a head underlying the plate part 27. The upper end of the pivot 44 is threaded to receive a nut 46 which overlies the cross head 42 and serves to prevent the pivot 44 from dropping out of the cross head.

Intermediate the ends of the handle 41 and located near the cross head 42 a generally longitudinal slot 47 is formed in handle 41. The slot is vertically arranged and receives a pin 48 slidable lengthwise in the slot and forming a connection between the handle 41 and the slide 33. As shown in FIG. 4, the pin 48 is received in a hole in the slide 33. The pin 48 extends upwardly through the slotted handle, and the upper end of the pin is threaded to receive nuts 49 and 50. A washer 51 is interposed between the nut 50 and an upper surface portion of the handle 41. The washer is not clamped to the handle 41 by the last-mentioned nuts but is slidable relatively to the handle. It will be understood from the foregoing description when the operator forces the hand grip portion 43 of the handle to the right as viewed in FIG. 1, the handle effects movement of the slide 33, carrying the chain support 34, toward the chain support 12.

As the welding circuit, not shown, necessarily passes through the welding fixture, it is desirable to have this circuit bypass the springs 35 of the work support 13 so that the springs will not be subject to excessive heat such as would impair the function of the springs over a period of time. For this purpose a flexible electrical connector 52 is provided. This connector, which is of strap form, has one end thereof secured to the pivot pin 48 and the other end secured to the pivot pin 44, the ends of these pivots extending through the respective ends of the straplike connector. As indicated in FIG. 4, the first-mentioned end of the connector may be clamped between the nuts 49 and 50 while the other end of the connector may be clamped between the nut 46 and a nut 46ª threaded on the pivot 44. It will be manifest from the foregoing that electrical current from the welding machinery may pass through the tire chain to the slide 33 and through the electrical connector 52 to the platelike part 27 of the work support 13. The current is conducted from the part 27 of the work support to the leg-supported bed of the fixture.

The use of the welding fixture will be apparent from the foregoing description. When it is desired to employ the fixture for the hard surfacing or rebuilding of cross links in a truck tire chain which may be of the dual type, as shown in FIG. 1, the work supports 12 and 13 are first adjusted longitudinally in the slideway 16 of the fixture in accordance with the width of the chain. The work supports 12 and 13 are adjusted in the slideway so that when the chain is properly positioned on the fixture, there is some tension on the chain transversely thereof when the slide 33 is in the normal or rest position thereof. It will be understood that the slide is operated by the handle 41 to enable the workman to place the chain on the hook element 34 of the slide after placing the other side of the chain over the hook element 22. After the chain is positioned on the fixture, the handle may be released so that the spring-biased slide may move a short distance in a direction away from the work support 12 and exert a degree of tension on the chain. It will be understood that the chain is moved progressively across the welding fixture and shifted with reference to the work supports 12 and 13 as the cross links of the chain are successively rebuilt by the operator of the welding machine. The rollers 20 at the sides of the fixture, which provide antifriction devices, facilitate the shifting of the chain across the fixture.

In accordance with the foregoing disclosure, there is provided an improved welding fixture especially useful for the hard surfacing and rebuilding of worn cross links in trunk tire chains by a welding operation. The fixture, which is very efficient in operation, is constructed of few and rugged parts and will not readily get out of order. Another advantage of the fixture is that it may be constructed at relatively low cost.

In the illustrated form, the fixture is shown supporting a dual truck chain in which the cross links at one side portion of the chain are in alignment with the cross links at the other side portion of the chain. However, it is to be understood that the fixture may support equally well a chain in which the cross links are in staggered relation to one another. Furthermore, while the work supports are illustrated as extending through certain links of the chain, this is not necessary for the support of the chain. The longitudinal links of the chain may merely overlie, for example, the respective chain-supporting members.

While only one form of the welding fixture has been illustrated in the drawing and described above, it will be appreciated by those versed in the art that the fixture may take other forms and is susceptible of various changes in details without departing from the principles of the invention and the scope of the appended claims.

What I claim is:

1. In a welding fixture for a truck tire chain having spaced parallel longitudinal chain lengths extending along the sides of the chain and longitudinally spaced cross lengths, a bed having means thereon providing an elongated slideway over which the chain may be moved lengthwise transversely of the slideway, a first chain support extending above the slideway and supported from the bed, means for securing said first chain support in fixed position relative to said slideway, said chain support having chain-securing means thereon for securement with one of the longitudinal lengths of the chain, a second chain support having means securable with the other of the longitudinal chain lengths, support means for the second chain support and mounted in said slideway for adjustment therealong, means for securing said support means in fixed position relative to said slideway, the second chain support being slidable in said support means in a direction lengthwise of the first-named slideway, spring means between said support means and the second chain support urging the latter in a direction away from the first chain support to spread said longitudinal lengths of the chain apart, and manually operable means connected to the second chain support to shift the latter in said support means toward the first chain support and enable the user to shift the chain with reference to said chain supports and move the chain transversely of the first-named slideway.

2. A welding fixture as defined in claim 1 wherein the first chain support is mounted in the first-named slideway and is infinitely adjustable toward and away from the second chain support, the first chain support being fixed in the first-named slideway in the desired adjusted position by said means for securing the first chain support.

3. A welding fixture as defined in claim 1 wherein antifriction means is provided at the respective sides of the first-named slideway to facilitate movement of the chain transversely of this slideway.

4. A welding fixture as defined in claim 3 wherein said antifriction means comprises a pair of antifriction rollers journaled in the bed, one at each side of the first-named slideway and extending along substantially the length of the latter.

5. A welding fixture as defined in claim 6 wherein said manually operable means connected to the second chain support to shift the latter in said support means toward the first chain support comprises an elongated handle having a manipulating end and having the other end thereof pivoted on said support means for swinging movement of the handle, said manually operable means also comprising a pivotal and slidable connection between the second chain support and a portion of the handle intermediate the ends thereof, the handle being swingable in one direction to shift the second chain support toward the first chain support.

References Cited in the file of this patent

UNITED STATES PATENTS

| Re. 7,192 | Hall | June 27, 1876 |
| 57,127 | Hall | Aug. 14, 1866 |

FOREIGN PATENTS

| 202,202 | Germany | Sept. 26, 1908 |